United States Patent Office 2,950,297
Patented Aug. 23, 1960

2,950,297
PROCESS FOR THE PRODUCTION OF 16-SUB-
STITUTED - 3α - ACETOXY - 17α - HYDROXY-
11,20-PREGNANEDIONE

Norman L. Wendler, Summit, N.J., assignor to Merck &
Co., Inc., Rahway, N.J., a corporation of New Jersey No Drawing. Filed Aug. 7, 1958, Ser. No. 753,639

5 Claims. (Cl. 260—397.45)

This invention is concerned generally with steroid compounds and with novel processes of preparing the same. More particularly, it relates to processes for the manufacture of 16-substituted-11-oxygenated steroids of the pregnane series unsaturated in ring A.

The 16-substituted steroids produced in accordance with this invention are useful intermediates which can be converted to 16-substituted cortical steroids which possess extremely high anti-inflammatory activity, considerably greater than that of the 16-unsubstituted compounds, and are especially effective for the treatment of arthritis and related diseases.

The present invention permits not only an improved transformation of the epoxy compound to the 17α-hydroxy, but also enables this change to occur in cases where there is an alkyl group attached to the 16-position where normal reagents have failed.

The process of the present invention regarded in certain of its broader aspects involves reacting a compound of the following formula—

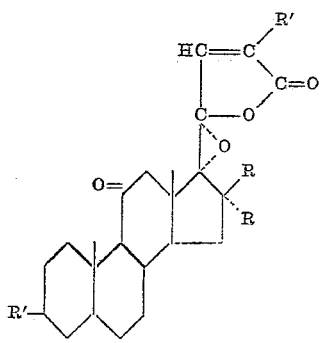

wherein R is hydrogen or alkyl and R' is acyloxy or hydroxy with an aliphatic or aromatic diamine to form a compound of the formula—

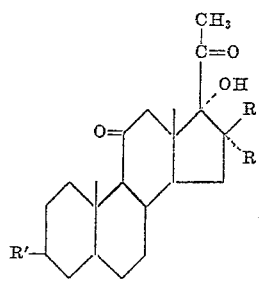

wherein R and R' are as above.

This reaction can be carried out on compounds where both 16α and 16β positions are hydrogen, or where one 16-position is hydrogen and the other alkyl or where both 16α and 16β are alkyl. The alkyl groups that can be attached at the 16-position include methyl, ethyl, propyl, and the like. As indicated hereinafter, 16-substituted shall mean a compound where the 16-position is hydrogen or alkyl in either the alpha or beta positions or both positions.

The starting material for the present invention is prepared by reacting 3α-acyloxy-11,20-pregnane-dione, 3α-acyloxy-16α-alkyl - 11,20 - pregnanedione, 3α-acyloxy-16-β-alkyl-11,20-pregnanedione or 3α - acyloxy-16,16-dialkyl-11,20-pregnanedione, with an alkyl oxalate to form an alkyl ester of 3α-acyloxy-16-substituted-11,20-dioxopregnane-21-glyoxylate, hydroxyzing the latter compound with alkali to 3α-hydroxy-16-substituted-11,20-dioxopregnane-21-glyoxylic acid and treating the latter with an acyl anhydride in the presence of a strong acid catalyst to form 3α,23-diacyloxy-16-substituted-21-normethyl-11-oxo-17(20)-22-choladieno - 24(20) - laictone or an isomeric mixture of 3α,23-diacyloxy-16-substituted-21-normethyl-11-oxo - 17(20) - 22-choladieno - 24(20) - lactone and the 17(20)-isomer thereof and reacting the latter compound or mixture with a peracid to form 3α,23-diacyloxy - 16 - substituted - 21 - normethyl - 17(20)-oxido-11-oxo-22-choleno-24(20)-lactone or an isomeric mixture of 3α,23-diacyloxy-16-substituted - 21 - normethyl-17(20)-isomer thereof.

It is this latter compound or an isomeric mixture thereof, namely, 3α,23-diacyloxy - 16 - substituted - 21 - normethyl-17(20)-oxido - 11 - oxo-22-choleno - 24(20) - lactone that is employed in the present process and is reacted with a 1,2-diamine such as ethylene diamine or o-phenylene diamine. The reaction is carried out in the presence of a suitable solvent such as benzene, tetrahydrofuran and the like and the 3α,17α-dihydroxy-16-substituted-11,20-pregnanedione is formed.

The 3α,17α-dihydroxy - 16 - substituted - 11,20-pregnanedione compounds produced by the present invention can be readily converted to 17α,21-dihydroxy-16-substituted-4-pregnene-3,11,20-triones, compounds possessing anti-inflammatory activity. The process involves reacting the 3α,17α-dihydroxy-16-substituted - 11,20 - pregnanedione with bromine to form 21-bromo-3α,17α-dihydroxy-16-substituted-11,20-pregnanedione, acetoxylating the latter compound to form 3α,17α,21-trihydroxy-16-substituted-11,20-pregnanedione 21-acetate, oxidizing the latter compound with chromium trioxide to form 17α,21-dihydroxy-16-substituted - 3,11,20 - pregnanetrione 21-acetate. Bromination of the latter compound results in the formation of 4-bromo-17α,21-dihydroxy-16-substituted-3,11,20-pregnanetrione 21-acetate. The latter is then reacted with lithium chloride in dimethylformamide to form a 17α-21-dihydroxy-16-substituted - 4 - pregnene - 3,11,20 - trione 21-acetate, a compound which possesses anti-inflammatory activity.

The following experimental part illustrates in detail some of the compounds which constitute this invention and methods for their production. However, this inven-

EXAMPLE 1

Preparation of 3α-acetoxy-17α-hydroxy-11,20-pregnanedione

To a solution of 1 g. of 3α,23-diacetoxy-21-normethyl-17(20)-oxido - 11 - oxo - 22 - choleno-24(20)-lactone in 20 cc. of tetrahydrofuran was added 2 cc. of ethylene diamine and the reaction mixture allowed to stand for 24 hours. The solvents were evaporated and the product extracted with benzene and washed with dilute hydrochloric acid. Sodium bicarbonate dried and evaporated to dryness. The residue was crystallized to give essentially a quantitative yield of 3α-acetoxy-17α-hydroxy-11,20-pregnanedione, M.P. 203–206° C.

EXAMPLE 2

Preparation of 3α,17α-dihydroxy-16α-methyl-11,20-pregnanedione

To 500 mg. of a mixture of 3α,23-diacetoxy-16α-methyl - 21 - normethyl - 17(20) - oxido - 11 - oxo - 22 - choleno-24(20)-lactone and 17(20)-isomer of 3α,23-diacetoxy - 16α - methyl - 21 - normethyl - 17(20) - oxido-11-oxo-22-choleno-24(20)-lactone (prepared as described herein below) in 10 cc. of tetrahydrofuran was added 2 cc. of ethylene diamine and the mixture was allowed to stand for 20–24 hours at room temperature. At the end of this period, the solvents were evaporated somewhat at room temperature in vacuo and the residue dissolved in benzene. The benzene extract was washed free of excess ethylene diamine with dilute acid and finally with aqueous sodium bicarbonate solution. The benzene solution was dried and concentrated to dryness in vacuo, and 3α-acetoxy-17α-hydroxy-16α-methyl-11,20-pregnanedione, M.P. 188–190° C., was recovered.

The above residue containing 3α-acetoxy-17α-hydroxy-16α-methyl-11,20-pregnanedione was dissolved in 10 cc. of methanol, treated with 0.8 cc. of concentrated hydrochloric acid and allowed to stand for 24 hours. At the end of this period the solvents were removed in vacuo at room temperature, the residue extracted with benzene and the benzene solution washed with sodium bicarbonate solution. The benzene solution was dried and concentrated to give 350 mg. (96.5%) of 3α,17α-dihydroxy-16α-methyl-11,20-pregnanedione, M.P. 170° C., phase change needles→prisms melting at 188–190° C. This material was single spot by paper strip chromatography, did not depress on melting with a known sample of 3α,17α-dihydroxy-16α-methyl-11,20-pregnanedione and was identical with the latter in the infrared spectrum.

The 3α,23 - diacetoxy - 16α - methyl - 21 - normethyl-17(20) - oxido - 11 - oxo - 22 - choleno - 24(20) - lactone used as a starting material in this example is prepared, starting with the known 3α-acetoxy-16-pregnene-11,20-dione in accordance with the following procedure:

A solution of 10.22 g. of methyl iodide in 50 ml. of ether is added to 1.73 g. of magnesium in 50 ml. of ether. To the resulting ethereal solution of methyl magnesium iodide, maintained under a nitrogen atmosphere, is added 0.045 g. of anhydrous cuprous chloride. To this mixture is added, over a period of about one hour, during which period the reaction mixture is stirred vigorously and maintained at approximately room temperature, a solution of about 5.6 g. of 3α-acetoxy-16-pregnene-11,20-dione in 175 ml. of ether. A white granular solid separates during this addition. The resulting mixture is heated under gentle reflux for two hours after which the reaction mixture is cooled, and 125 ml. of saturated, aqueous ammonium chloride solution is added followed by 200 ml. of ether. The layers are separated, and the ethereal layer is washed with three 50 ml. portions of water. The washed ethereal layer is dried, and the solvent evaporated in vacuo to give a brown viscous oil. The latter material is heated for 15 minutes at 60–70° C. with a mixture of 25 ml. acetic anhydride and 25 ml. pyridine and the acetylated product is purified by chromatography on acid-washed alumina followed by crystallization from petroleum ether to give substantially pure 3α-acetoxy-16α-methyl-11,20-pregnenedione.

To 3.18 g. of sodium was added dropwise 35 ml. of methanol and hydrogen was evolved. After all methanol was added, the sodium was all dissolved. To this solution was added 100 cc. of toluene and the methanol distilled using a column to prevent entrainment of toluene. When the boiling point of toluene was reached (110° C.), the reaction was cooled to 25° C.

To the reaction mixture was added 24.2 g. of diethyl oxalate and the mixture cooled when necessary to maintain a 20–25° C. temperature. With agitation, 10 g. of finely powdered 3α-acetoxy-16α-methyl-11,20-pregnanedione was added. The total mixture was stirred for 18 hours and clear yellow solution containing ethyl-3α-hydroxy - 16α - methyl - 11,20 - dioxo - 21 - pregnaneglyoxylate resulted.

The solution of ethyl-3α-hydroxy-16α-methyl-11,20-dioxo-21-pregnaneglyoxylate was added slowly with stirring to 200–250 cc. of petroleum ether. A solid sodium salt of ethyl-3-hydroxy-16α-methyl-11,20-dioxo-21-pregnaneglyoxylate precipitated. The mixture was filtered, washed with petroleum ether, and dried.

In order to hydrolyze ethyl-3α-hydroxy-16α-methyl-11,20-dioxo-21-pregnaneglyoxylate, the solid was slurried in 70 cc. of methanol and to this was added 280 cc. of 0.5 N sodium hydroxide slowly in 20 minutes. The mixture was stirred at 25° C. for five minutes. At the end of this time a turbid mixture occurred. To this turbid reaction mixture was added 9 g. of diatomaceous earth and the mixture filtered through a pad of diatomaceous earth. The filtrate was acidified, with stirring, by adding 1 N hydrochloric acid slowly. The fluffy, white precipitate, 3α - hydroxy - 16α - methyl - 11,20-dioxo-21-pregnaneglyoxylic acid, was filtered and washed well in water and dried in vacuo at 60° C. until Karl Fisher for water was less than 0.5%.

To a slurry of 1.0 g. (2.39 m.) of 3α-hydroxy-16α-methyl-11,20-dioxo-21-pregnaneglyoxylic acid in 10 ml. of acetic anhydride was added 30 mg. of 2,4-dinitrobenzenesulfonic acid. The solid was completely in solution after about 15 minutes. The solution was stirred at 25° C. for 2.5 hours and then concentrated in vacuo to a thick syrup (waterbath at 50° C.). The syrup was dissolved in 25 ml. of benzene and washed twice with 10 ml. portions of 2.5 N sodium hydroxide and 10 ml. of water. After drying the benzene solution with magnesium sulfate, the reaction mixture was concentrated in vacuo to an amorphous solid which is an isomeric mixture of 3α,23 - diacetoxy - 16α - methyl - 21 - normethyl - 11 - oxo - 17(20) - 22 - choladieno - 24(20)-lactone and the 17(20)-isomer of 3α,23-diacetoxy-16α-methyl - 21 - normethyl - 11 - oxo - 17(20) - 22 - choladieno-24(20)-lactone. This crude isomeric mixture was crystallized from 4 ml. of ethanol.

8.5 g. of an isomeric mixture of 3α,23-diacetoxy-16α-methyl-21-normethyl-11-oxo-17(20) - 22 - choladieno-24(20)-lacetone and the 17(20)-isomer of 3α,23-diacetoxy-16α-methyl-21-normethyl-11-oxo-17(20)-22 - choladieno-24(20)-lactone was allowed to 110 cc. of the benzene solution of perbenzoic acid and allowed to stand at 25° C. for 140 hours. The reaction was then cooled to 15° C. and washed with 50 cc. of water. Finally the excess acid was removed by extracting three times with 50 cc.

portions of 10% sodium bicarbonate solution and then washed twice with 50 cc. portions of water. The aqueous layer was backwashed twice with 25 cc. portions of benzene and the combined organic extract dried over sodium sulfate, filtered and concentrated in vacuo to an oily residue. This residue readily crystallized. The yield was quantitative. In order to separate from ethyl benzoate the crystalline residue was refluxed with 160 cc. of petroleum ether and filtered. The crystalline precipitate was an isomeric mixture of 3α,23-diacetoxy-16α-methyl-21-normethyl-17(20)-oxido-11-oxo-22-choleno - 24(20)- lactone, and the 17(20)-isomer of 3α,23-diacetoxy-16α-methyl-21-normethyl-17(20)-oxido-11 - oxo - 22 - choleno-24(20)-lactone.

EXAMPLE 3

*Preparation of 3α-acetoxy-17α-hydroxy-16β-methyl-11, 20-pregnane-dione*

To 250 mg. of an isomeric mixture of 3α,23-diacetoxy-16β-methyl-21-normethyl-17(20)-oxido-11-oxo - 22 - choleno-24(20)-lactone and the 17(20)-isomer of 3α,23-diacetoxy-16β-methyl-21-normethyl-17(20)-oxido - 11-oxo-22-choleno-24(20)-lactone (prepared as described hereinbelow) in 5 cc. of tetrahydrofuran was added 1 cc. of ethylene diamine and the mixture was allowed to stand for 20–24 hours at room temperature. At the end of this period, the solvents were evaporated somewhat at room temperature in vacuo and the residue dissolved in benzene. The benzene extract was washed free of excess ethylene diamine with dilute acid and finally with aqueous sodium bicarbonate solution. The benzene solution was dried and concentrated to dryness in vacuo and 3α-acetoxy-17α-hydroxy-16β-methyl-11,20 - pregnane - dione, M.P. 192–197°, was recovered.

The isomeric mixture of 3α,23-diacetoxy-16β-methyl-21-normethyl-17(20)-oxido-11-oxo-22 - choleno - 24(20)-lactone and the 17(20)-isomer thereof used as a starting material in this example is prepared starting with the known 3α-acetoxy-16-pregnene-11,20-dione in accordance with the following procedure:

In a 500 ml. 3-neck flask equipped with condenser, dropping funnel and nitrogen inlet were placed 20 g. of potassium hydroxide in 90 ml. of water, 100 ml. of methanol and 100 ml. of ether. A solution of 10 g. of N-methyl-N-nitrosotosylamide in 50 ml. of ether was placed in the dropping funnel.

Diazomethane was generated by warming the generation flask to 40°–45° C. and cautiously adding the N-methyl-N-nitrosotosylamide-ether from the dropping funnel. Nitrogen was utilized to sweep the diazomethane into a solution of 20 g. of 3α-acetoxy-16-pregnene-11,20-dione in 100 ml. of tetrahydrofuran and 120 ml. of ether. The process was continued until the steroid solution remained yellow for several hours. The product, 3α-acetoxy-16α, 17α-methyleneazo-pregnane-11,20-dione largely precipitated from the reaction mixture. After 16 hours, the mixture was filtered, washed with ether and dried in air.

37.4 grams of 3α-acetoxy-16α,17α-methyleneazopregnane-11,20-dione was heated by an oil bath in vacuo (pressure 0.6 mm.). When the bath temperature reached 180° C., the 3α-acetoxy-16α,17α-methyleneazopregnane-11,20-dione began to melt with evolution of nitrogen. The maximum pressure reached was 83 mm. After 10 minutes at 180–182° C., the melt was cooled. It was takend up in about 150 ml. of acetone, filtered through diatomaceous earth, concentrated to about 100 ml. and ether slowly added to the boiling solution until crystallization of 3α-acetoxy-16-methyl-16-pregnene-11,20-dione.

To a solution of 200 mg. of 3α-acetoxy-16-methyl-16-pregnene-11,20-dione in 20 ml. of methanol was added 200 mg. of 25% palladium on calcium carbonate catalyst. The mixture was stirred in hydrogen (1 atmosphere pressure, 25° C.) until hydrogen uptake was complete. The mixture was filtered, the filtrate taken to dryness and the residue crystallized from ether-hexane to give 3α-acetoxy-16β-methyl-11,20-pregnanedione.

The 3α-acetoxy-16β-methyl-11,20-pregnanedione thus obtained is reacted in the same manner as 3α-acetoxy-16α-methyl-11,20-pregnanedione described in the previous Example 3. Here, 3α-acetoxy-16β-methyl-11,20-pregnanedione is reacted with diethyl oxalate to form ethyl-3α-hydroxy-16β-methyl-11,20 - dioxo - 21 - pregnaneglyoxylate, and the latter compound hydrolyzed to form 3α-hydroxy-16β-methyl-11,20-dioxo - 21 - pregnaneglyoxylic acid. Reaction of the latter compound with acetic anhydride in the presence of a strong acid catalyst results in the formation of an isomeric mixture of 3α,23-diacetoxy-16β-methyl-21-normethyl-11-oxo-17(20)-22 - choladieno-24(20)-lactone and the 17(20)-isomer thereof. The latter mixture is then reacted with a peracid to form an isomeric mixture of 3α,23-diacetoxy-16β-methyl-21-normethyl-17(20)-oxido-11-oxo-22-choleno-24(20) - lactone and the 17(20)-isomer thereof.

EXAMPLE 4

*Preparation of 3α-acetoxy-17α-hydroxy-16,16-dimethyl-11,20-pregnanedione*

A solution of 100 mg. of 3α,23-diacetoxy-16,16-dimethyl-21-normethyl-17(20)-oxido-11-oxo - 22 - choleno-24(20)-lactone in 2 cc. of tetrahydrofuran was treated with 0.1 cc. of ethylene diamine and the reaction mixture allowed to stand for 20–24 hours at room temperature. At the conclusion of this time, the reaction mixture was diluted with benzene and the benzene solution washed with dilute sodium bicarbonate solution and water. The benzene solution was dried and evaporated to give 80 mg. (98.5%) of essentially pure 3α-acetoxy-17α-hydroxy-16,16-dimethyl-11,20-pregnanedione, M.P. 205–209° C.

The 3α,23-diacetoxy-16,16-dimethyl-21-normethyl-17-(20)-oxido-11-oxo-22-choleno-24(20)-lactone used as a starting material in this example is prepared, starting with 3α-acetoxy-16-methyl-16-pregnene-11,20-dione the preparation of which is described in the previous Example 3.

To a stirred solution of methyl magnesium iodide under nitrogen at 20° C. prepared from 12.5 g. of magnesium and 77 g. of methyl iodide in 1250 ml. of dry ethyl ether was added 0.31 g. of cuprous chloride followed by 23.5 g. of 3α-acetoxy-16-methyl-16-pregnene-11,20-dione in 100 ml. of benzene and 1,000 ml. of ether. The stirred reaction mixture was refluxed for 4 hours. It was then cooled to 0° C. and 2,190 ml. of saturated aqueous ammonium chloride was added. The phases were separated, the aqueous phase was extracted with benzene and the combined organic phase was washed with water and dried over magnesium sulfate. Removal of the solvents gave 3α-hydroxy-16,16-dimethyl-11,20-pregnanedione.

Acetylation of 3α-hydrovy-16,16-dimethyl-11,20-pregnanedione in 125 ml. of pyridine and 35 ml. of acetic anhydride at 25° C. for 18 hours followed by thorough pumping at 0.1 min. gave 3α-acetoxy-16,16-dimethyl-11, 20-pregnanedione.

To 160 mg. of freshly prepared dry sodium methoxide was added 295 mg. of dimethyl oxalate in 2 ml. of benzene followed by 200 mg. of 3α-acetoxy-16,16-dimethyl-11,20-pregnanedione in 3 ml. of benzene. The mixture was stirred at 25° C. for 18 hours. Cold, dilute hydrochloric acid was added, and the mixture extracted with ether and dried over sodium sulfate. Removal of the solvent left a residue consisting of the methyl ester of 3α-hydroxy-16, 16-dimethyl-11,20-dioxo-21-pregnane-glyoxylic acid.

The methyl ester of 3α-hydroxy-16,16-dimethyl-11,20-dioxo-21-pregnaneglyoxalate was dissolved in 3 ml. of methanol, 5 ml. of 1 N potassium hydroxide was added and the solution kept at 25° C. for 5 hours. The methanol was removed in vacuo and traces of neutral material removed by ether extraction. Acidification of the basic aqueous phases precipitated 3α-hydroxy-16,16-dimethyl-11,20-dioxo-21-pregnaneglyoxylic acid. It was filtered, washed with water, and air-dried.

To a stirred suspension of 170 mg. of 3α-hydroxy-16,16-dimethyl-11,20-dioxo-21-pregnaneglyoxylic acid in 3 ml. of carbon tetrachloride cooled to 0° C. was added dropwise a cooled (0° C.) mixture of 0.54 ml. of acetic anhydride and one drop of perchloric acid. The steroid dissolved and the solution was stirred 45 minutes at 20° C. The reaction mixture was cooled to 0° C. and cold 5% sodium carbonate and chloroform added. The organic layer was washed with cold 5% sodium carbonate water and dried over sodium sulfate. Trituration of the residue with ether gave crystalline 3α,23-diacetoxy-16,16-dimethyl-21-normethyl-11-oxo-17(20)-22-choladieno - 24-(20)-lactone.

To 220 mg. of the crystalline 3α,23-diacetoxy-16,16-dimethyl-21-normethyl-11-oxo-17(20),22 - choladieno - 24-(20)-lactone was added 2.5 ml. of 1.0 M. perbenzoic acid in benzene. After 4 days at 25° C. the reaction mixture was diluted to 25 ml. with benzene and washed successively with 5% sodium sulfite, 5% potassium bicarbonate and water. The benzene layer was dried over magnesium sulfate and taken to dryness. Trituration of the residue with ether gave crystalline 3α,23-diacetoxy-16,16-dimethyl-21-normethyl-17(20)-oxido-11-oxo-22 - choleno-24(20)-lactone.

EXAMPLE 5

3α-acetoxy-17α-hydroxy-11,20-pregnanedione, 3α,17α-dihydroxy-16α-methyl-11,20 - pregnanedione, 3α - acetoxy-17α-hydroxy-16β-methyl-11,20-pregnanedione and 3α-acetoxy-17α-hydroxy-16,16-dimethyl-11,20-pregnanedione prepared by the procedures outlined in Examples 1–4 can be readily converted to the corresponding 17α,21-dihydroxy-4-pregnene-3,11,20-triones having a hydrogen or alkyl group in the 16-position by the following procedure:

In order to illustrate this reaction, 3α,17α-dihydroxy-11,20-pregnanedione having a 16α-methyl group has been used, however, any of the other compounds substituted in the 16-position could be employed. To a solution of 7.0 g. of 3α,17α-dihydroxy-16α-methyl-11.20-pregnanedione in 50 ml. of chloroform is added dropwise with stirring, a solution containing 3.36 g. of bromine in 24.2 ml. of chloroform over a period of about 60 minutes. The reaction mixture is dissolved in 200 ml. of ethyl acetate, and the resulting solution washed with water until neutral. dried, and the solvents evaporated therefrom in vacuo. The residual material is dissolved in a minimum quantity of ethyl acetate, the resulting solution is diluted with ether, and the mixture is stirred until crystals form. The crystalline product is recovered by filtration and washed, by slurrying, with 50:50 ether-petroleum ether mixture to give 5 g. of 21-bromo-3α,17α-dihydroxy-16α-methyl-11,20-pregnanedione.

This 5 g. of 21-bromo-3α,17α-dihydroxy-16α-methyl-11,20-pregnanedione is mixed with 5.0 g. of anhydrous potassium acetate, 4.0 g. of sodium iodide and 0.03 ml. of glacial acetic acid, and 100 ml. of acetone is added to the resulting mixture. This mixture is then heated at reflux, with stirring, for a period of about 16 hours, and the reaction mixture is cooled, filtered, and the insoluble material is washed with acetone. The filtered solution is evaporated in vacuo thereby removing the solvents, and the aqueous mixture extracted with ethyl acetate. The ethyl acetate extract is washed with water to neutrality, dried, and the solvent is evaporated in vacuo to give an oil. This oil is crystallized from ether, and recrystallized from ethyl acetate-ether to give 3α,17α,21-trihydroxy-16α-methyl-11,20-pregnanedione 21-acetate.

A solution of 400 mg. of 3α,17α,21-trihydroxy-16α-methyl-11,20-pregnanedione 21-acetate in 4 ml. of pyridine is added to the complex formed by the addition of 400 mg. of chromium trioxide to 4 ml. of pyridine. The mixture is swirled until thoroughly mixed and then allowed to stand at room temperature for about 16 hours. The reaction mixture is poured into water, and the aqueous mixture is extracted with ether, and then twice with ethyl acetate. The combined ether and ethyl acetate extracts are washed with dilute aqueous sulfuric acid at about 0° C., and then with water until neutral. The organic solvent layer is then dried, the solvents are evaporated therefrom in vacuo, and the residual crystalline material is purified by crystallization from ethyl acetate to give 17α,21-dihydroxy-16α-methyl-3,11,20-pregnanetrione 21-acetate.

To 100 mg. of 17α,21-dihydroxy-16α-methyl-3,11,20-pregnane-trione 21-acetate dissolved in 2 ml. of chloroform and 2.25 ml. of glacial acetic acid, at a temperature of −55° C., is added two drops of a 0.001 N solution of dry hydrogen bromide in glacial acetic acid. To about 0.38 ml. of 0.001 N hydrogen bromide in glacial acetic acid, at 55° C., is added 0.43 ml. of a solution containing 40 mg. of bromine in chloroform, and the resulting solution is added, over about a 10-minute period, to the solution of the steroid, while maintaining the reaction mixture at about −55° C. The reaction mixture is allowed to stand at −55° C. for about one-half hour; a solution containing 250 mg. of sodium acetate in 3 ml. of water is added, and the resulting mixture is stirred for about 5 minutes. Five milliliters of water are then added, and the aqueous mixture is extracted with ethyl acetate. The ethyl acetate extract is washed with aqueous sodium bicarbonate solution to neutrality, then with water, dried, and the solvent is evaporated in vacuo. The residual material is dissolved in 2 ml. of acetone, and to the solution is added 25 mg. of sodium bromide and 1 ml. of water. The resulting mixture is heated under reflux for a period of about 5 hours, the reaction mixture is cooled, and the acetone is evaporated in vacuo. The residual material is extracted into ether, the ether extract is washed with water, dried, and the solvent is evaporated to a volume of about 1 ml., petroleum ether is added to this solution, and the crystalline material which separates is recovered and dried to give approximately 90 mg. of 4-bromo-17α,21-dihydroxy-16α-methyl-3,11,20-pregnanetrione 21-acetate.

A solution of 50 mg. of 4-bromo-17α,21-dihydroxy-16α-methyl-3,11,20-pregnanetrione 21-acetate in 10 cc. of dimethylformamide was heated 4 hours at 100° C. with 25 mg. of lithium chloride. At the end of this period, the reaction mixture was cooled and diluted with water to the point of crystallization to give 17α,21-dihydroxy - 16α - methyl-4-pregnene-3,11,20-trione which compound possesses anti-inflammatory activity.

Various changes and modifications may be made in the present invention, certain preferred embodiments of which are herein disclosed, without departing from the scope thereof; to the extent that these changes and modifications are within the scope of the appended claims, they are to be considered a part of this invention.

What is claimed is:
1. The process which comprises reacting 3α,23-diacetoxy - 21 - normethyl - 17(20) - oxido - 11-oxo-22-choleno-24(20)-lactone with ethylene diamine to form 3α-acetoxy-17α-hydroxy-11,20-pregnanedione.

2. The process which comprises reacting 3α,23-diacetoxy-16α-methyl-21-normethyl - 17(20) - oxido - 11-oxo-22-choleno-24(20)-lactone with ethylene diamine to form 3α - acetoxy - 17α - hydroxy-16α-methyl-11,20-pregnanedione.

3. The process which comprises reacting 3α-23-diacetoxy - 16β - methyl - 21 - normethyl-17(20)-oxido-11-oxo-22-choleno-24(20)-lactone with ethylene diamine to form 3α - acetoxy - 17α - hydroxy-16β-methyl-11,20-pregnanedione.

4. The process which comprises reacting 3α,23-diacetoxy -16,16 - dimethyl - 21 - normethyl-17(20)-oxido-11-oxo-22-choleno-24(20)-lactone with ethylene diamine to form 3α - acetoxy - 17α - hydroxy - 16,16-dimethyl-11,20-pregnanedione.

5. The process which comprises reacting a compound of the formula—
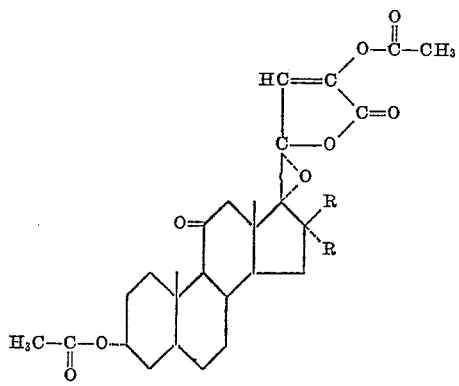
wherein R is selected from the group consisting of hydrogen and lower alkyl with ethylene diamine to form a compound of the formula—
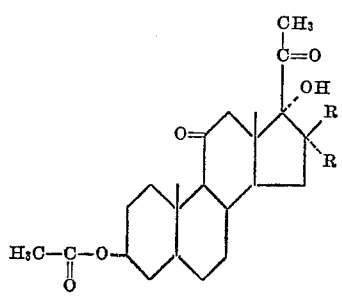
wherein R is as above.
References Cited in the file of this patent
UNITED STATES PATENTS
2,740,783   Hogg _____ Apr. 3, 1956